US012418836B2

(12) United States Patent
Sukojo

(10) Patent No.: US 12,418,836 B2
(45) Date of Patent: Sep. 16, 2025

(54) RECOMMENDING A THRESHOLD FOR A DATA USAGE TYPE ASSOCIATED WITH A MOBILE DEVICE OPERATING ON A WIRELESS TELECOMMUNICATION NETWORK

(71) Applicant: T-Mobile USA, Inc., Bellevue, WA (US)

(72) Inventor: Andiputranto Sukojo, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 521 days.

(21) Appl. No.: 17/967,867

(22) Filed: Oct. 17, 2022

(65) Prior Publication Data
US 2024/0129803 A1 Apr. 18, 2024

(51) Int. Cl.
*H04W 28/20* (2009.01)
*H04W 28/08* (2023.01)

(52) U.S. Cl.
CPC ......... *H04W 28/20* (2013.01); *H04W 28/095* (2020.05)

(58) Field of Classification Search
CPC ..... H04W 28/20; H04W 28/095; H04W 4/24; H04W 72/52; H04L 47/20; H04L 12/1435; H04M 15/58; H04M 15/8214; H04M 15/83; H04M 15/85; H04M 15/852; H04M 15/853; H04M 15/854
See application file for complete search history.

(56) References Cited

U.S. PATENT DOCUMENTS

| | | | |
|---|---|---|---|
| 5,627,886 A * | 5/1997 | Bowman | H04M 15/49 379/189 |
| 7,193,966 B2 | 3/2007 | Gupta et al. | |
| 7,486,696 B2 | 2/2009 | Garg et al. | |
| 7,734,807 B2 | 6/2010 | Shuster | |
| 7,873,074 B1 | 1/2011 | Boland | |
| 7,895,247 B2 | 2/2011 | Hankin | |

(Continued)

FOREIGN PATENT DOCUMENTS

| | | | | |
|---|---|---|---|---|
| CA | 2813321 C | * | 10/2020 | ............ G06F 17/00 |
| CN | 108140230 B | | 8/2019 | |

(Continued)

*Primary Examiner* — Yuwen Pan
*Assistant Examiner* — Swati Jain
(74) *Attorney, Agent, or Firm* — Perkins Coie LLP

(57) ABSTRACT

The system obtains multiple thresholds for multiple bandwidth usage types associated with a UE. The threshold indicates an amount of bandwidth available to the UE over a predetermined period. Each threshold corresponds to a bandwidth usage type. The multiple thresholds include: roaming data, home data, voice over IP, international voice over IP, roaming voice over IP, international data, and tethering data threshold. The system obtains multiple bandwidth usage patterns of the UE, where each bandwidth usage pattern corresponds to a threshold. The system iterates over each bandwidth usage to determine whether the UE has exceeded or is likely to exceed the threshold within the predetermined period. Upon determining that a bandwidth usage pattern has exceeded or is likely to exceed the threshold within the predetermined period, the system determines an increase to the threshold. The system sends an indication of the increase to the threshold to the UE.

20 Claims, 9 Drawing Sheets

(56) References Cited

U.S. PATENT DOCUMENTS

| | | | |
|---|---|---|---|
| 7,957,271 B2 | 6/2011 | Creamer et al. | |
| 8,045,473 B2 | 10/2011 | Hammer | |
| 8,055,237 B2 | 11/2011 | Jones et al. | |
| 8,090,480 B2 | 1/2012 | Brumfield et al. | |
| 8,112,062 B2* | 2/2012 | Pattabiraman | H04W 4/24 |
| | | | 455/406 |
| 8,200,188 B2 | 6/2012 | Gans | |
| 8,285,250 B2* | 10/2012 | Rubin | H04W 28/10 |
| | | | 455/406 |
| 8,320,246 B2 | 11/2012 | Foottit et al. | |
| 8,320,256 B2 | 11/2012 | Temple | |
| 8,510,763 B2 | 8/2013 | Fatehpuria et al. | |
| 8,792,857 B2 | 7/2014 | Cai et al. | |
| 8,891,746 B2 | 11/2014 | Stachiw et al. | |
| 9,124,436 B2* | 9/2015 | Kashanian | H04L 12/1435 |
| 9,137,739 B2 | 9/2015 | Raleigh | |
| 9,203,629 B2 | 12/2015 | Momtahan et al. | |
| 9,251,115 B2 | 2/2016 | Bursell | |
| 9,325,597 B1* | 4/2016 | Clasen | H04L 47/762 |
| 9,332,132 B1 | 5/2016 | Milhizer | |
| 9,374,289 B2 | 6/2016 | Kotecha et al. | |
| 9,396,482 B2 | 7/2016 | Hao et al. | |
| 9,465,343 B2 | 10/2016 | Kamasuka | |
| 9,467,572 B2* | 10/2016 | Leemet | H04W 4/24 |
| 9,544,902 B1* | 1/2017 | Narendran | H04W 72/04 |
| 9,565,544 B1 | 2/2017 | Reeves et al. | |
| 9,619,397 B2 | 4/2017 | Bhattacharyya et al. | |
| 9,621,446 B2 | 4/2017 | Pugh et al. | |
| 9,641,696 B2 | 5/2017 | Cai et al. | |
| 9,660,889 B2 | 5/2017 | Zalmanovitch et al. | |
| 9,690,685 B2 | 6/2017 | Vyas et al. | |
| 9,716,596 B2 | 7/2017 | Shaw | |
| 9,736,321 B2 | 8/2017 | Bell et al. | |
| 9,736,671 B2* | 8/2017 | Adinarayan | H04M 15/88 |
| 9,749,209 B2 | 8/2017 | Cimino et al. | |
| 9,762,743 B2 | 9/2017 | Anand | |
| 9,769,643 B2* | 9/2017 | Baron | H04M 15/85 |
| 9,775,158 B2 | 9/2017 | Kalmbach et al. | |
| 9,865,009 B2* | 1/2018 | Chiang | H04M 15/43 |
| 9,883,413 B2* | 1/2018 | Cama | H04W 24/08 |
| 9,967,145 B2 | 5/2018 | Kim | |
| 10,225,355 B2 | 3/2019 | Vuornos et al. | |
| 10,235,662 B2 | 3/2019 | Curtis | |
| 10,356,552 B1 | 7/2019 | Anders et al. | |
| 10,462,624 B1 | 10/2019 | Aijazi et al. | |
| 10,491,459 B1 | 11/2019 | Andreas et al. | |
| 10,832,817 B2 | 11/2020 | Allison et al. | |
| 10,896,432 B1* | 1/2021 | Bhaktwatsalam | H04L 43/0876 |
| 10,977,105 B2 | 4/2021 | Kao | |
| 11,006,268 B1 | 5/2021 | Kim et al. | |
| 11,096,070 B2* | 8/2021 | Venkatraman | H04L 47/29 |
| 11,240,049 B2 | 2/2022 | Karri et al. | |
| 11,329,902 B2 | 5/2022 | Pilkington-lewis et al. | |
| 11,424,993 B1 | 8/2022 | Chaoji et al. | |
| 11,429,377 B2 | 8/2022 | Mezaael et al. | |
| 2004/0209595 A1 | 10/2004 | Bekanich | |
| 2005/0052992 A1 | 3/2005 | Cloonan et al. | |
| 2005/0266825 A1 | 12/2005 | Clayton | |
| 2007/0076728 A1* | 4/2007 | Rieger | H04L 47/822 |
| | | | 370/468 |
| 2011/0255404 A1 | 10/2011 | Kafka et al. | |
| 2012/0005107 A1 | 1/2012 | Lowden et al. | |
| 2012/0198046 A1 | 8/2012 | Shah et al. | |
| 2012/0239805 A1* | 9/2012 | Savoor | H04L 41/5029 |
| | | | 709/224 |
| 2012/0295580 A1 | 11/2012 | Corner | |
| 2013/0205001 A1 | 8/2013 | Reed et al. | |
| 2013/0225181 A1 | 8/2013 | Radulescu et al. | |
| 2013/0272219 A1 | 10/2013 | Radulescu et al. | |
| 2014/0179266 A1 | 6/2014 | Schultz et al. | |
| 2017/0012790 A1* | 1/2017 | Leemet | H04M 15/47 |
| 2017/0373959 A1* | 12/2017 | Zalmanovitch | H04M 15/853 |
| 2019/0238644 A1 | 8/2019 | Chauhan et al. | |
| 2020/0099706 A1 | 3/2020 | Righi et al. | |
| 2022/0141110 A1* | 5/2022 | Zalmanovitch | H04L 43/045 |
| | | | 709/224 |

FOREIGN PATENT DOCUMENTS

| | | |
|---|---|---|
| CN | 111124267 A | 5/2020 |
| CN | 112166406 A | 1/2021 |
| CN | 112602080 A | 4/2021 |
| DE | 112011105672 T5 | 7/2014 |
| DE | 102016105595 A1 | 9/2016 |
| EP | 2766841 A1 | 8/2014 |
| EP | 2915053 A2 | 9/2015 |
| EP | 3207762 A1 | 8/2017 |
| EP | 3044546 B1 | 2/2019 |
| EP | 3446441 A2 | 2/2019 |
| EP | 3466145 A1 | 4/2019 |
| EP | 3514752 A1 | 7/2019 |
| EP | 3777330 A2 | 2/2021 |
| EP | 3857356 A1 | 8/2021 |
| EP | 3513541 B1 | 12/2021 |
| EP | 3289370 B1 | 5/2022 |
| JP | 2015507268 A | 3/2015 |
| KR | 101386521 B1 | 4/2014 |
| KR | 101539619 B1 | 7/2015 |
| WO | 2010128391 A2 | 11/2010 |
| WO | 2013085713 A1 | 6/2013 |
| WO | 2014003750 A1 | 1/2014 |
| WO | 2014113586 A1 | 7/2014 |
| WO | 2015197564 A1 | 12/2015 |
| WO | 2016019372 A1 | 2/2016 |
| WO | 2016130759 A1 | 8/2016 |
| WO | 2017120095 A1 | 7/2017 |
| WO | 2017183029 A1 | 10/2017 |
| WO | 2018007906 A1 | 1/2018 |

* cited by examiner

RECOMMENDING A THRESHOLD FOR A DATA USAGE TYPE ASSOCIATED WITH A MOBILE DEVICE OPERATING ON A WIRELESS TELECOMMUNICATION NETWORK

BACKGROUND

When a mobile device exceeds its allotted bandwidth usage on a wireless telecommunication network, the wireless telecommunication network can throttle the mobile device's bandwidth. Bandwidth throttling consists of the intentional limitation of the communication speed (bytes, kilobytes, or megabytes per second) or the communication amount (bytes, kilobytes, megabytes) of the ingoing (received) data and/or in the limitation of the speed of outgoing (sent) data to a network node or a network device. The data speed and data amount may be limited depending on various parameters and conditions.

BRIEF DESCRIPTION OF THE DRAWINGS

Detailed descriptions of implementations of the present invention will be described and explained through the use of the accompanying drawings.

Figure 1:
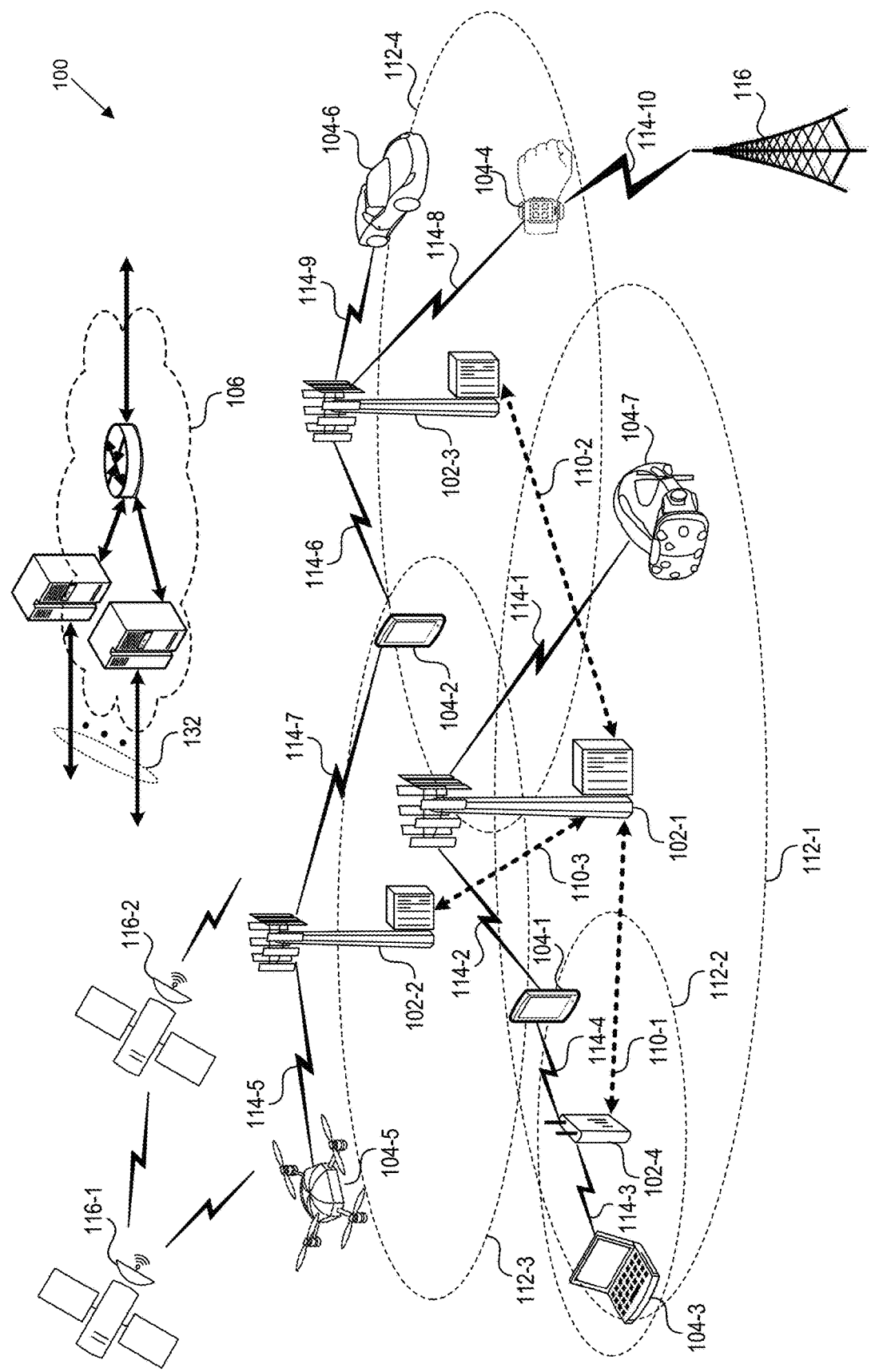
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system recommends a threshold, e.g. allotted bandwidth usage, for each of multiple bandwidth usage types associated with a mobile device operating on a wireless telecommunication network. The bandwidth usage types can be for roaming data, home data, voice over Internet Protocol (IP) network usage, international voice over IP usage, roaming voice over IP usage, international data, and/or tethering data. The roaming data provides data connectivity to the mobile device when the mobile device is not connected to the home network, while the home data provides data connectivity to the mobile device when connected to the home network. Voice over IP provides voice connectivity to the mobile device when the mobile device is connected to the home network, and international voice over IP provides voice connectivity when connected to an international carrier. The roaming voice over IP provides voice connectivity to the mobile device when the mobile device is not connected to the home network, while international data provides data connectivity on an international network. Tethering data enables the mobile device to act as a hotspot and provide Internet connectivity to neighboring devices connected to the mobile device's hotspot.

The system obtains multiple thresholds for multiple bandwidth usage types associated with the mobile device, where each threshold among the multiple thresholds indicates an amount of bandwidth that the mobile device is allowed to use over a predetermined period. Each threshold among the multiple thresholds corresponds to a bandwidth usage type among the multiple bandwidth usage types.

The system obtains multiple bandwidth usage patterns associated with the mobile device, where each bandwidth usage pattern corresponds to one of the multiple thresholds. The system iterates over each bandwidth usage pattern to determine whether the mobile device has exceeded or is likely to exceed the threshold associated with each bandwidth usage pattern within the predetermined period. Upon determining that the bandwidth usage pattern has exceeded or is likely to exceed the threshold, within the predetermined period, the system determines an increase to the threshold, where the increase to the threshold accommodates an anticipated bandwidth usage associated with the bandwidth usage pattern.

The system sends an indication of the increase to the threshold to the mobile device and receives a response from the mobile device. Based on the response, the system applies the increase to the threshold. For example, if the response indicates that the device user has accepted the increase in exchange for a fee, the system applies the increase to the threshold. If the response does not indicate acceptance, the system does not modify the threshold.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WVAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple subcarriers (e.g., waveform signals of different frequencies) modulated according to the various radio technologies. Each modulated signal can be sent on a different subcarrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, ARNR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
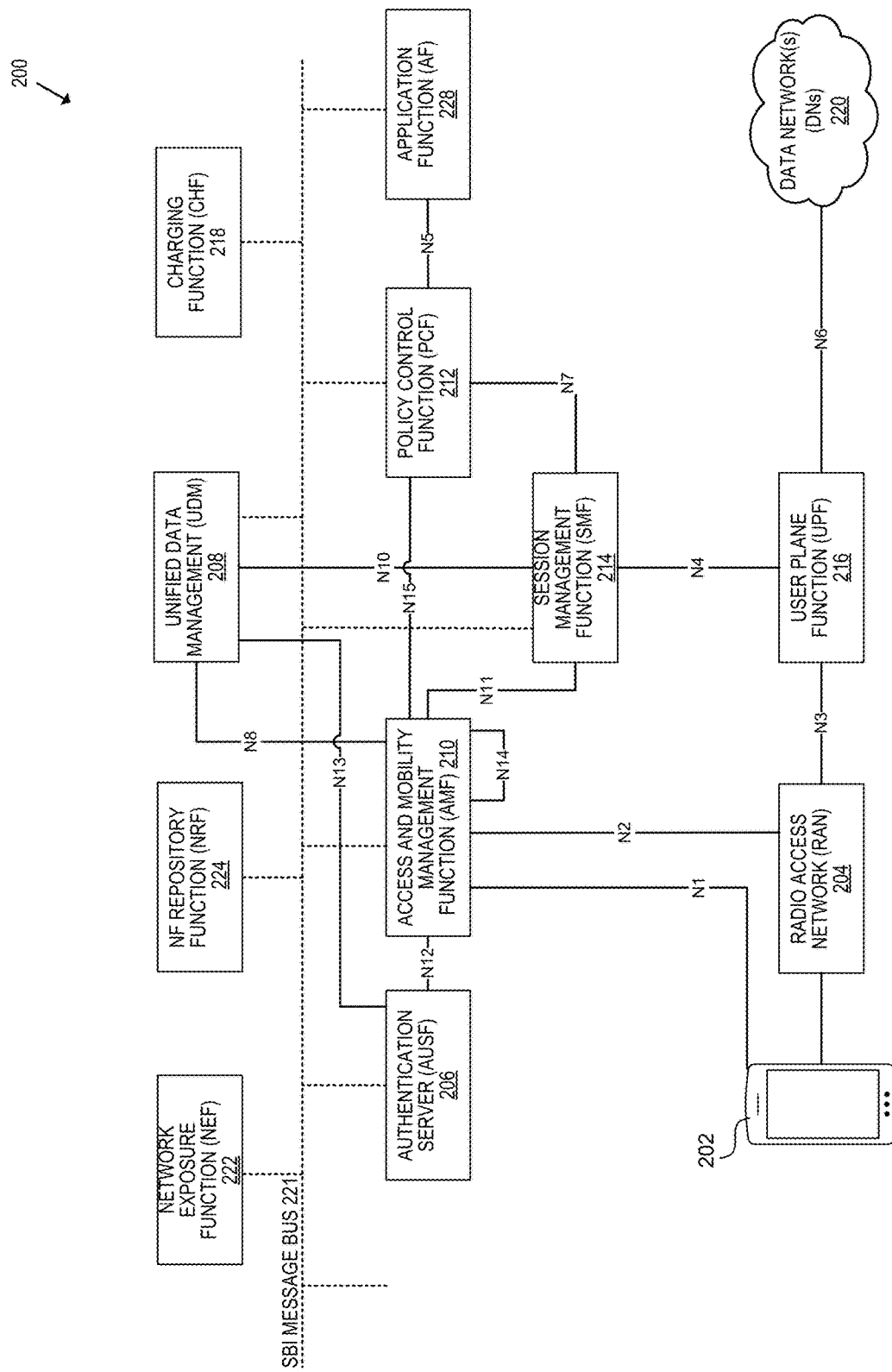
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Figure 3:
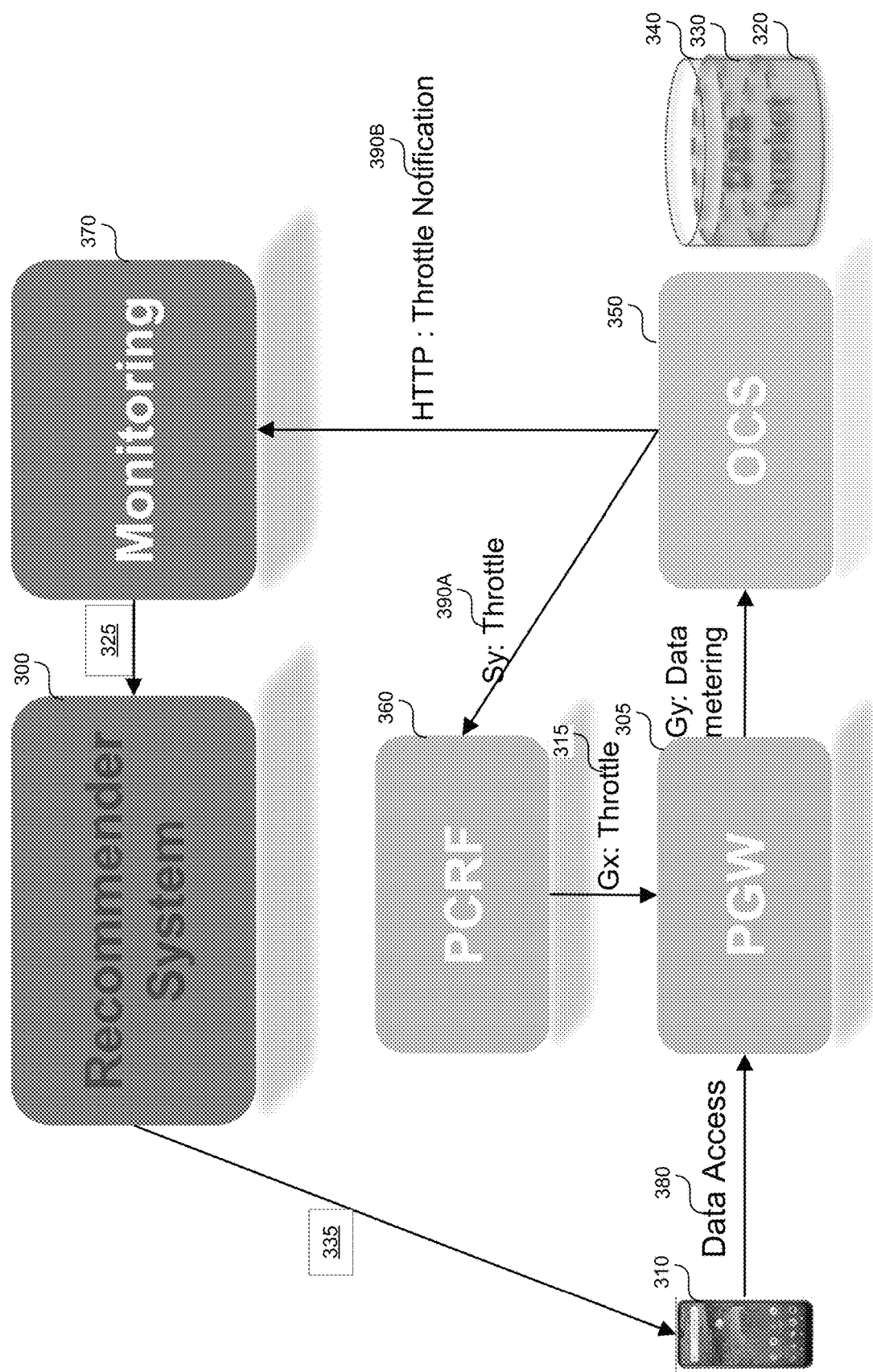
FIG. 3 shows a recommender system to recommend a threshold for a data usage type associated with a user equipment (UE) operating on the network.

Recommending a Threshold for a Data Usage Type Associated with a Mobile Device Operating on a Wireless Telecommunication Network FIG. 3 shows a recommender system 300 to recommend a threshold for a data usage type associated with a user equipment (UE) operating on the network 100 in FIG. 1. The UE 310 can access the network 100 through the Packet Network Data Gateway (PGW) 305 which can provide voice, data, and multimedia connectivity to the UE. To obtain voice, data, and/or multimedia services, the UE 310 can have access to multiple data usage types, e.g., multiple bandwidth usage types, on the network 100. The multiple data usage types can include a roaming data, a home data, a voice over IP, an international voice over IP, a roaming voice over IP, an international data, and/or a tethering data.

The roaming data provides data connectivity to the UE 310 when the UE is not connected to the home network. The home data provides data connectivity to the UE 310, when the UE is connected to the home network. The voice over IP provides voice connectivity to the UE 310, when the UE is connected to the home network. The international voice over IP provides voice connectivity to the UE 310, when the UE is connected to an international carrier. The roaming voice over IP provides voice connectivity to the UE 310, when the UE is not connected to the home network. International data provides data connectivity to the UE 310 on an international network. Tethering data enables the UE 310 to act as a hotspot and provide Internet connectivity to neighboring devices connected to the UE's hotspot.

Figure 4:
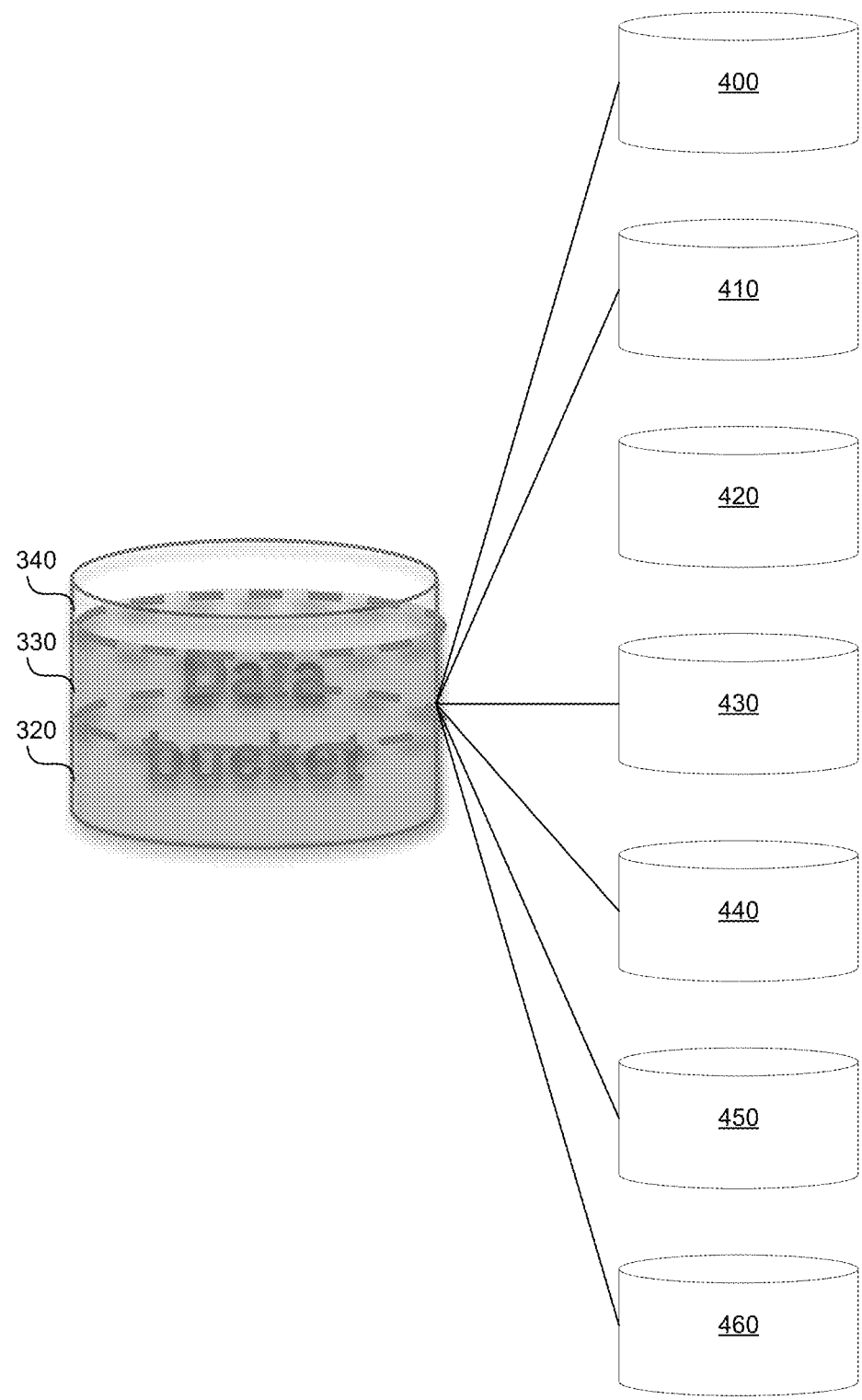
FIG. 4 shows various thresholds that the Online Charging Server (OCS) can monitor.

Each data usage type among the multiple data usage types can have a corresponding threshold 320, 330, or 340 as further explained in FIG. 4. The threshold 320, 330, 340 indicates an amount of bandwidth, e.g. data, that the UE 310 is allowed to use over a predetermined period on the network 100. The predetermined period can be a week, a month, six months, a year, etc.

The OCS 350 monitors a data usage pattern associated 380 with the UE 310. For example, the threshold 320, 330, 340 can correspond to home data, roaming data, and tethering data, respectively. The threshold 320, 330, 340 can provide a limit such as 1 GB for home data, 10 MB for roaming data, and 20 MB per tethering data. Alternatively, the threshold 320, 330, 340 can provide a limit such as 20 GB for home data or 200 MB for roaming data and indicate whether tethering is enabled or disabled without providing a specific data limit for tethering. The data usage pattern 380 can indicate how much of home data, roaming data, and/or tethering data the UE 310 has used up within the current predetermined period.

The OCS 350 can determine whether the data usage pattern 380 has exceeded a threshold 320, 330, 340. Upon determining that the data usage pattern 380 has exceeded at least one of the thresholds 320, 330, or 340, the OCS 350 can send a notification 390A, 390B to Policy and Charging Rules Function (PCRF) 360 and the monitoring system 370. The notification 390A, 390B can include an indication to throttle a daily usage type associated with the data usage pattern 380 that has exceeded the threshold 320, 330, 340. Alternatively, the notification 390A, 390B can include an indication to completely discontinue the data usage type associated with data usage pattern 380.

Once the PCRF 360 receives the notification 390A, the PCRF can send a notification 315 to PGW 305 to throttle or discontinue the incoming communication from the UE 310. The monitoring system 370 can send a notification 325 to the recommender system 300 to indicate the throttling or discontinuation of the data usage type associated with the data usage pattern 380.

The recommender system 300 can determine whether to recommend an increase in the threshold 320, 330, 340 associated with the data usage pattern 380, and it can determine a period for which the increase should be recommended. For example, the recommender system 300 can determine that the UE 310 has a subscription for 1 GB of home data for a month and that the UE 310 has used 1 GB of home data in 10 days. Consequently, the recommender system 300 can determine that the UE 310 is likely to use 2 GB in the next 20 days remaining in the month. The recommender system 300 can send a message 335 to the UE 310 indicating to increase the home data by 2 GB over the next 20 days.

In another example, the recommender system 300 can obtain a historical data associated with the UE 310 indicating data usage patterns of the UE over the past six months, year, or several years. The recommender system 300 can determine a frequent data usage pattern associated with a data usage type among the multiple data usage types. For example, the frequent data usage pattern can indicate that the UE 310 uses 20 to 50 MB of international voice during a month, while the current threshold for international voice is 10 MB a month. Consequently, the recommender system 300 can recommend that the UE 310 increase the international voice threshold by 40 MB permanently. In another example, the recommender system 300 can determine frequent upgrades to the threshold that the UE 310 accepts, e.g., the UE 310 frequently exceeds the home data threshold and accepts a 5 GB monthly increase. Consequently, the recommender system 300 can recommend that the UE 310 increase the home data threshold by 5 GB permanently.

FIG. 4 shows various thresholds that the Online Charging Server (OCS) 350 in FIG. 3 can monitor. The threshold 320, 330, 340 in FIG. 3 can include the roaming data threshold 400, the home data threshold 410, the voice over IP threshold 420, the international voice over IP 430, the roaming voice over IP 440, the international data 450, and the tethering data threshold 460. Some thresholds 400-460 can be expressed in bytes, such as 10 GB, or 30 MB, while some thresholds can be expressed as whether the corresponding data usage type is enabled or not. For example, the tethering data threshold 460 can be expressed as enabled or disabled. If the tethering threshold is disabled, the UE 310 in FIG. 3 cannot provide tethering services.

Each threshold 400-460 can have a corresponding throttling rate, which indicates that if the threshold has been exceeded, the service will be throttled to a particular speed such as 128 Kilobits per second.

Figure 5:
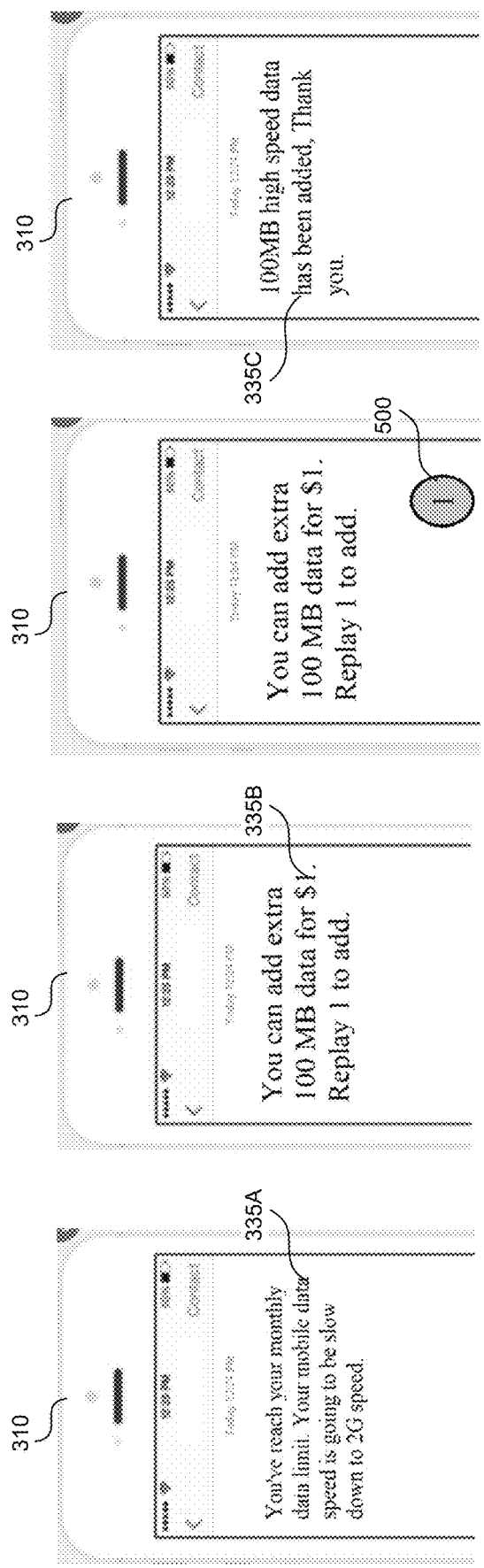
FIG. 5 shows the message presented on the UE.

FIG. 5 shows the message 335 in FIG. 3 presented on the UE 310. The message 335A can indicate to the user that the user has reached the monthly data limit and that a data usage type, such as home data, is going to slow down to 2G speed. The message 335B can indicate to the user that the user can make an increase, such as 100 MB, to the data usage type by replying, such as pressing a predetermined button 500, e.g., "1." Once the user presses the predetermined button 500, the UE 310 can present the message 335C indicating that the threshold has been increased.

The messages 335A-335C can be text messages and consume very little bandwidth, such as 2 kilobytes (kB) or less of data. Minimizing the bandwidth consumption is important because the UE 310 has exceeded the threshold. Requiring the UE 310 to access a webpage and browse available upgrades is slow or impossible because the bandwidth of the UE 310 has been throttled or even disabled. In addition, the response received from the UE 310 can consume a single bit because the response indicates an acceptance or a denial, which can be coded as a 0 or 1. Usually accessing a webpage can take approximately 3 megabytes (MB). By comparison, communicating using text increases bandwidth efficiency of the network 100 in FIG. 1 because instead of consuming 3 MB, the whole communication takes approximately 2 kB.

Figure 6:
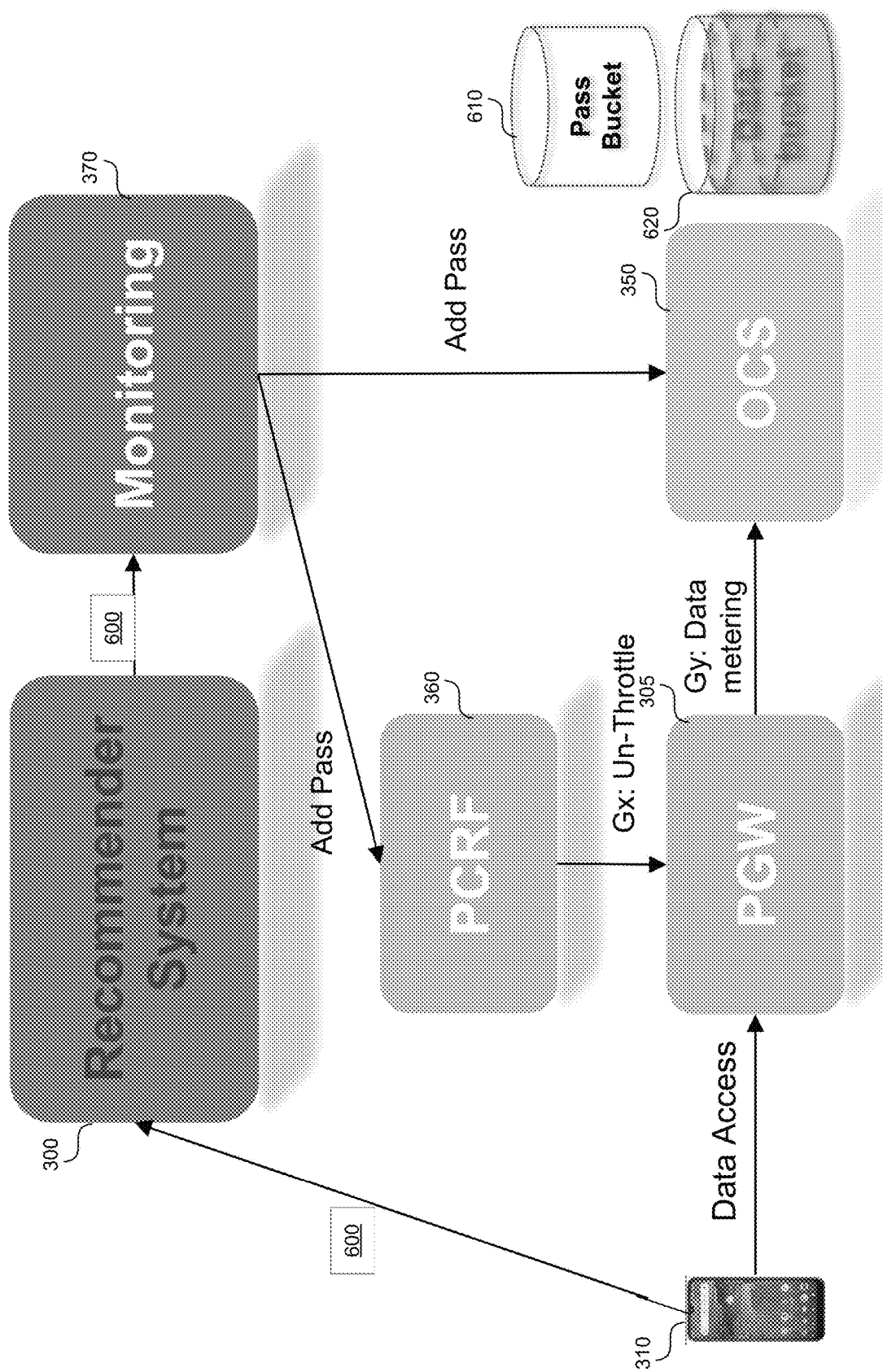
FIG. 6 shows recommender system actions upon receiving an affirmative response from the UE.

FIG. 6 shows recommender system actions upon receiving an affirmative response from the UE 310. If the UE 310 does not accept the recommended increase, the recommender system 300 leaves the data usage type throttled or disabled.

The UE 310 can send an acceptance 600 of the recommended increase to the recommender system 300. Consequently, the recommender system 300 can forward the acceptance 600 to the monitoring system 370, which in turn can indicate to the PCRF 360 and the OCS 350 to add a pass 610, that is, increase a threshold 620 that has been exceeded. The pass 610 can indicate an amount of time during which the pass applies. The amount of time can be temporary or can be permanent. Once the OCS 350 increases the threshold 620 by an amount indicated in the pass 610, the UE 310 can continue using the data usage type at normal speed.

Figure 7:
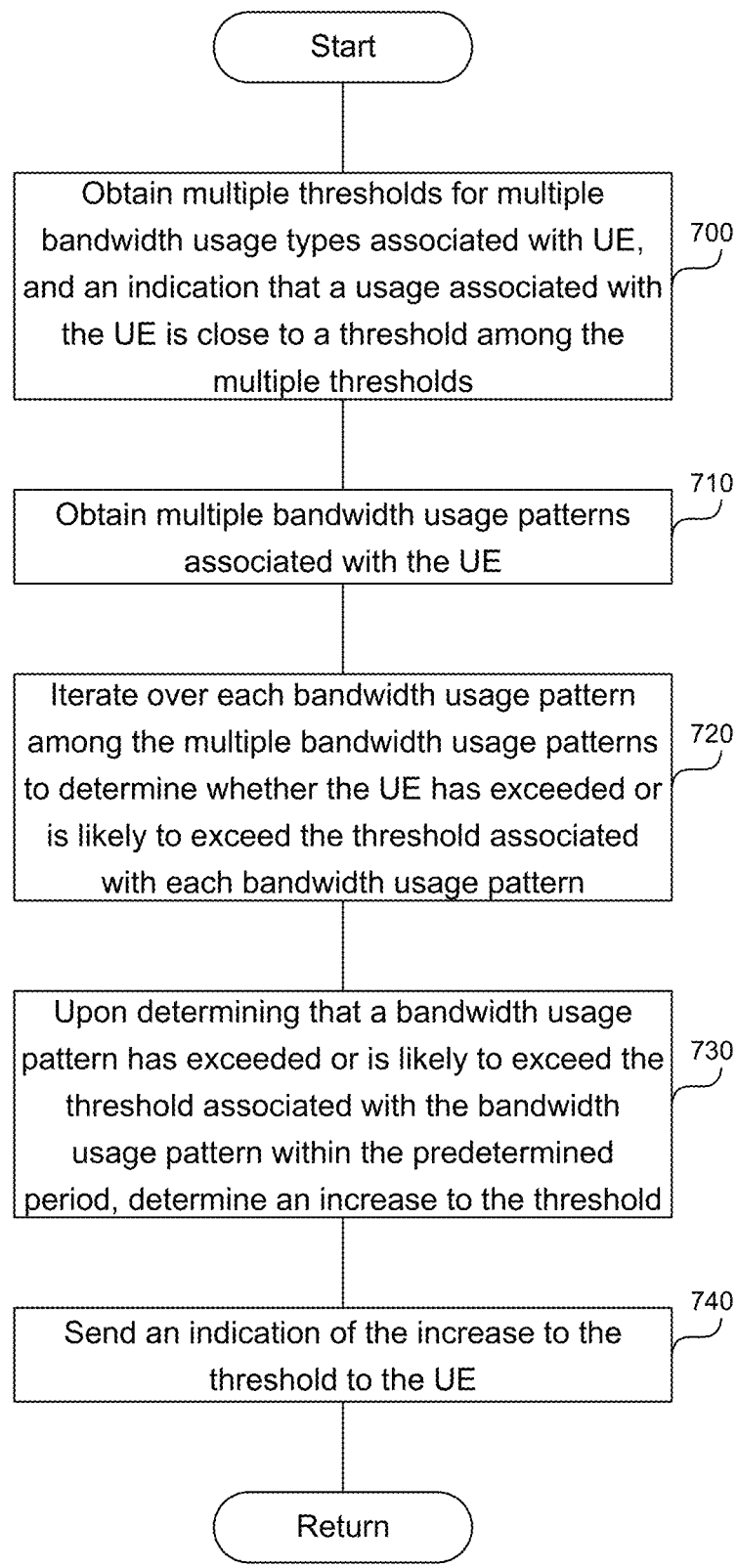
FIG. 7 is a flowchart of a method to recommend a threshold for a data usage type associated with a UE operating on a network.

FIG. 7 is a flowchart of a method to recommend a threshold for a data usage type associated with a UE operating on a network 100 in FIG. 1. In step 700, a hardware or software processor executing instructions described this application can obtain multiple thresholds for multiple bandwidth usage types associated with the UE and an indication that a usage associated with the UE is close to threshold among the multiple thresholds. Being close to the threshold can mean above or below the threshold by 20%.

A threshold among the multiple thresholds indicates an amount of bandwidth, e.g., data, associated with a network 100 that the UE is allowed to use over a predetermined period, such as a day, week, month, several months a year, etc. One threshold among the multiple thresholds can correspond to one or more bandwidth usage types among the multiple bandwidth usage types.

The multiple thresholds can include at least two of: a roaming data threshold, a home data threshold, a voice over IP threshold, an international voice over IP threshold, a roaming voice over IP threshold, an international data threshold, and a tethering data threshold. The roaming data threshold limits the amount of data, over the predetermined period, that the UE can use while not on the home network. The home data threshold limits the amount of data, over the predetermined period, that the UE can use while in the home network. The voice over IP threshold limits the amount of voice over IP, over the predetermined period, that the UE can use while on the home network. The international voice over IP limits the amount of voice over IP, over the predetermined period, that the user can use while on an international network. The roaming voice over IP limits the amount of voice over IP, over the predetermined period, that the UE can use while not connected to the home network. The international data limits the amount of international data, over the predetermined period, that the UE can use while connected to an international network. The tethering data limits the amount of data, over the predetermined period, that the UE can provide to other devices connected to the UE's hotspot.

In step 710, the processor can obtain multiple bandwidth usage patterns associated with the UE, where each bandwidth usage pattern among the multiple bandwidth usage patterns corresponds to at least one threshold among the multiple thresholds.

In step 720, upon obtaining the indication that the usage associated with the UE is close to the threshold among the multiple thresholds, such as within 20% of the threshold amount, the processor can iterate over each bandwidth usage pattern among the multiple bandwidth usage patterns to determine whether the UE has exceeded or is likely to exceed, within the predetermined period, the threshold associated with each bandwidth usage pattern.

In step 730, upon determining that bandwidth usage pattern has exceeded or is likely to exceed the threshold associated with the bandwidth usage pattern within the predetermined period, the processor can determine an increase to the threshold, where the increase to the threshold accommodates an anticipated usage associated with the bandwidth usage pattern. For example, if the UE has used 10 GB of voice over IP on the home network within the first 20 days of the predetermined period and there are 10 days remaining, the processor can determine that the anticipated usage in the next 10 days is 5 GB. Consequently, the processor can suggest increasing the voice over IP threshold by 5 GB.

To determine the increase to the threshold, the processor can determine whether the bandwidth usage pattern exceeds the threshold. Upon determining that the bandwidth usage pattern exceeds the threshold, the processor can determine a rate of usage associated with each bandwidth usage type. For example, the processor can determine that the UE used 1 GB in 10 days and can compute the rate of usage to be 100 MB per day. The processor can determine time remaining within the predetermined period, such as 20 days. Based on the time remaining within the predetermined period and the rate of usage associated with each bandwidth usage type, the processor can determine the anticipated usage. For example, the processor can multiply the 20 remaining days by the 100 MB per day rate of usage to determine that the anticipated usage is 2 GB.

In step 740, the processor can send an indication of the increase to the threshold to the UE, along with the request to indicate acceptance of the increase. The processor can receive a response from the UE. Based on the response, the processor can apply the increase to the threshold. If the response is acceptance, the processor can apply the increase, if the response does not indicate acceptance, the processor can throttle or completely discontinue the bandwidth usage type associated with the threshold.

The processor can perform historical analysis to determine whether to recommend a permanent increase in the bandwidth usage type. The processor can obtain historical data associated with the UE indicating a second multiplicity of bandwidth usage patterns associated with the UE over a period greater than the predetermined period. The period can include multiple predetermined periods. For example, if the predetermined period is a month, the period can include six months or a year. The processor can iterate over the multiple predetermined periods to determine a frequent bandwidth usage pattern associated with a bandwidth usage type among the multiple bandwidth usage types. The processor can determine whether the frequent bandwidth usage pattern associated with the bandwidth usage type exceeds a threshold associated with the bandwidth usage type. Upon determining that the frequent bandwidth usage pattern associated with the bandwidth usage type exceeds the threshold associated with the bandwidth usage type, the processor can send an indication to the UE to make the increase permanent.

For example, the bandwidth usage type is roaming data, and the threshold for roaming data is 100 MB. The frequent bandwidth usage pattern can indicate that in the last 12 months, for seven months out of the 12 months, the roaming data used was between 300 and 500 MB. The processor can determine that the roaming data usage between 300 and 500 MB is greater than the threshold of 100 MB. The processor can send a notification to UE to increase the roaming data bandwidth to between 300 and 500 MB because for more than half the time in the last 12 months, the roaming data usage was in the 300-500 MB range.

The processor can perform historical analysis to determine to recommend a temporary increase in the bandwidth usage type. Upon determining that the frequent bandwidth usage pattern associated with the bandwidth usage type does not exceed the threshold associated with the bandwidth usage type, the processor can determine a time remaining within the predetermined period. The processor can send an indication to the UE to make the increase within the time remaining within the predetermined period.

The processor can send the message and receive a response from the user without needing a web interface, thus significantly reducing bandwidth consumed over the network 100. The processor can send a message to the UE indicating a response that, when generated by the UE, represents an acceptance of the increase, where the message consumes less than 3 kB of bandwidth associated with UE. The processor can receive the response representing the acceptance of the increase, where the response consumes 4 bytes or less of bandwidth associated with the UE. On average, communicating with a webpage consumes approximately 3 MB, thus bandwidth consumption of 3 kB offers significant savings.

The processor can determine whether the UE exceeded the international data threshold over multiple previous predetermined periods. In addition to the international data threshold, the processor can consider other thresholds such as roaming data threshold, a home data threshold, a voice over IP threshold, an international voice over IP threshold, a roaming voice over IP threshold, and a tethering data threshold. Upon determining that the UE exceeded the international data threshold over the multiple previous predetermined periods, the processor can determine an average amount by which the UE exceeded the international data threshold over the multiple previous predetermined periods. The processor can send a notification to the UE to permanently increase the international data threshold by the average amount.

The processor can determine whether the UE exceeded the roaming data threshold over multiple previous predetermined periods. In addition to the roaming data threshold, the processor can consider other thresholds such as the international data threshold, a home data threshold, a voice over IP threshold, an international voice over IP threshold, a roaming voice over IP threshold, and a tethering data threshold. Upon determining that the UE exceeded the roaming data threshold over the multiple previous predetermined periods, the processor can determine a maximum amount by which the UE exceeded the international data threshold over the multiple previous predetermined periods. The processor can send a notification to the UE to permanently increase the roaming data threshold by the maximum amount.

Figure 8:
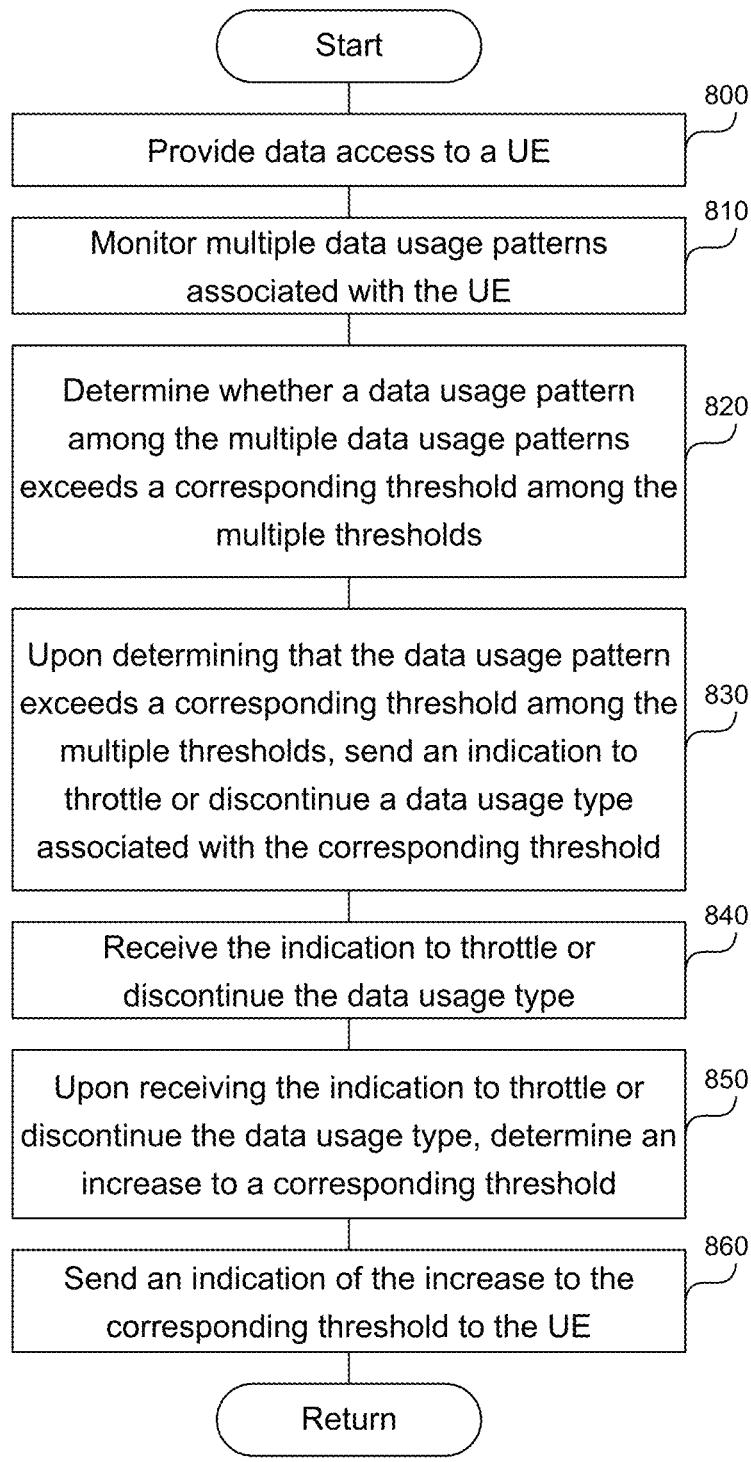
FIG. 8 shows steps various system components can perform to recommend a threshold for a data usage type associated with a UE operating on a network.

FIG. 8 shows steps various system components can perform to recommend a threshold for a data usage type associated with a UE operating on a network 100 in FIG. 1. In step 800, a PGW can provide data access to a UE, where the data access includes multiple thresholds for the multiple data usage types associated with the UE. A threshold among the multiple thresholds indicates an amount of data, e.g., bandwidth, associated with a wireless telecommunication network that the UE is allowed to use over a predetermined period. Each threshold among the multiple thresholds corresponds to a data usage type among the multiple data usage types. The multiple thresholds include at least two of: a roaming data threshold, a home data threshold, a voice over IP threshold, an international voice over IP threshold, a roaming voice over IP threshold, an international data threshold, and a tethering data threshold.

In step 810, an OCS can monitor multiple data usage patterns associated with the UE, where each data usage pattern among the multiple data usage patterns corresponds to a threshold among the multiple thresholds. In step 820, the OCS can determine whether a data usage pattern among the multiple data usage patterns exceeds a corresponding threshold among the multiple thresholds. In step 830, upon determining that the data usage pattern exceeds a corresponding threshold among the multiple thresholds, the OCS can send an indication to throttle or discontinue a data usage type associated with the corresponding threshold.

In step 840, a recommender system can receive the indication to throttle or discontinue the data usage type. In step 850, upon receiving the indication to throttle or discontinue the data usage type, the recommender system can determine an increase to a corresponding threshold, where the increase to the corresponding threshold accommodates an anticipated usage associated with the data usage pattern. In step 860, the recommender system can send an indication of the increase to the corresponding threshold to the UE. The recommender system can receive a response from the UE and, based on the response, apply the increase to the corresponding threshold.

The recommender system can obtain historical data associated with the UE, where the historical data indicates a second multiplicity of data usage patterns associated with the UE over a period. The period can include multiple predetermined periods, such as two, 10, 12, etc. predetermined periods. The recommender system can iterate over the multiple predetermined periods to determine a frequent data usage pattern associated with a data usage type among the multiple data usage types. The recommender system can determine whether the frequent data usage pattern associated with the data usage type exceeds a threshold associated with the data usage type. Upon determining that the frequent data usage pattern associated with the data usage type exceeds the threshold associated with the data usage type, the recommender system can send an indication to the UE to make the increase permanent.

The recommender system can obtain historical data associated with the UE, where the historical data indicates a second multiplicity of data usage patterns associated with the UE over a period. The period can include multiple predetermined periods. The recommender system can iterate over the multiple predetermined periods to determine a frequent data usage pattern associated with a data usage type among the multiple data usage types. The recommender system can determine whether the frequent data usage pattern associated with the data usage type exceeds a threshold associated with the data usage type. Upon determining that the frequent data usage pattern associated with the data usage type does not exceed the threshold associated with the data usage type, the recommender system can determine a time remaining within the predetermined period. The recommender system can send an indication to the UE to make the increase within the time remaining within the predetermined period.

The recommender system can determine whether the data usage pattern exceeds the threshold. Upon determining that the data usage pattern exceeds the threshold, the recommender system can determine a rate of usage associated with each data usage type. The recommender system can determine time remaining within the predetermined period. Based on the time remaining within the predetermined period and the rate of usage associated with each data usage type, the recommender system can determine the anticipated usage.

The recommender system can send a message to the UE indicating a response that, when generated by the UE, represents an acceptance of the increase, where the message consumes less than 2 kB of data associated with UE. The recommender system can receive the response representing the acceptance of the increase, where the response consumes 4 bytes or less of data associated with the UE.

The recommender system can determine whether the UE exceeds the international data threshold over multiple previous predetermined periods. Upon determining that the UE exceeds the international data threshold over the multiple previous predetermined periods, the recommender system can determine an average amount by which the UE exceeds the international data threshold over the multiple previous predetermined periods. The recommender system can send a notification to the UE to permanently increase the international data threshold by the average amount.

The recommender system can determine whether the UE exceeds the roaming data threshold over multiple previous predetermined periods. Upon determining that the UE exceeds the roaming data threshold over the multiple previous predetermined periods, the recommender system can determine a maximum amount by which the UE exceeds the international data threshold over the multiple previous predetermined periods. The recommender system can send a notification to the UE to permanently increase the roaming data threshold by the maximum amount.

Computer System

Figure 9:
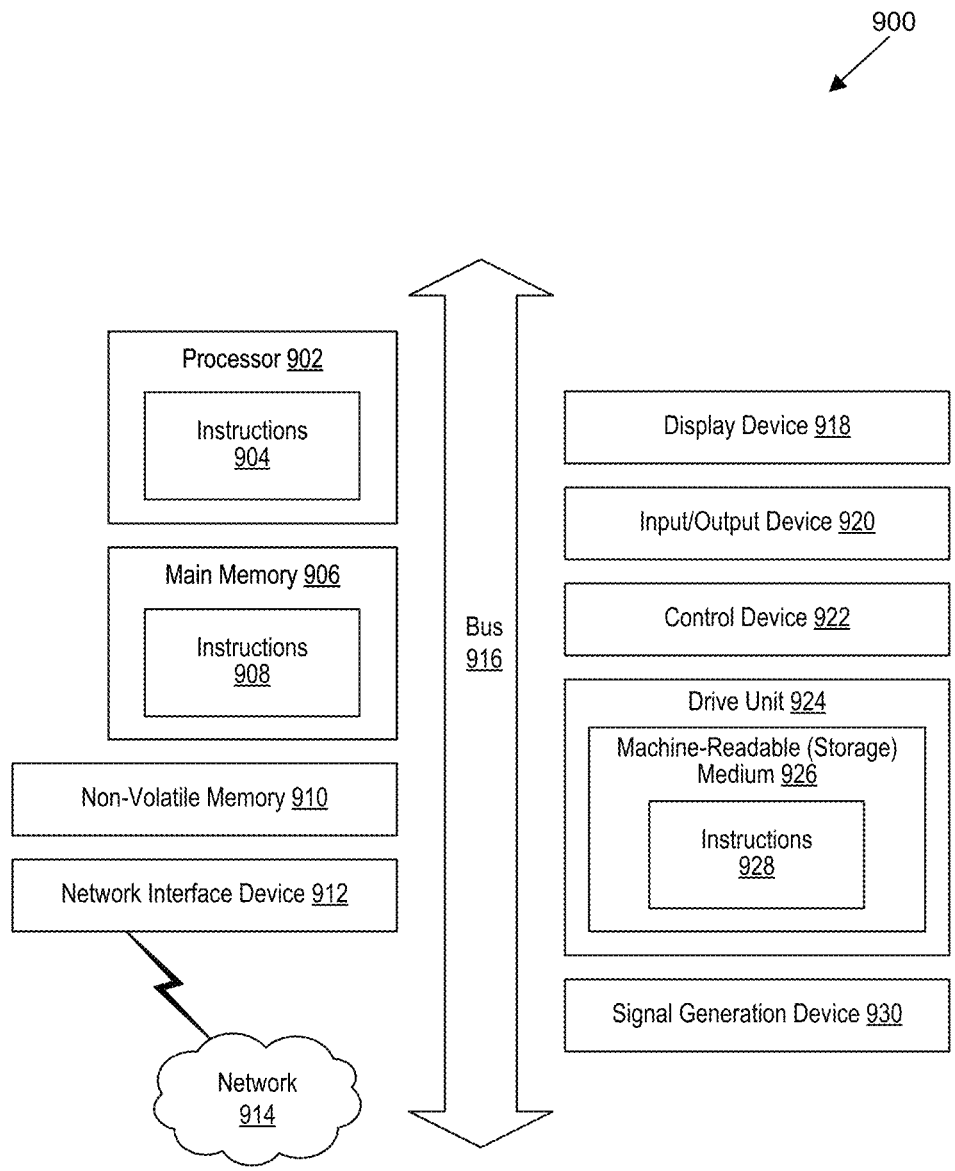
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930, all of which are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computing system 900. In some implementations, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real time, near real time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. At least one non-transitory computer-readable storage medium storing instructions to provide at least one threshold for at least one data usage type associated with a mobile device operating on a wireless telecommunication network, which, when executed by at least one data processor of a system, cause the system to:
   obtain multiple thresholds for multiple data usage types associated with the mobile device,
      wherein each threshold among the multiple thresholds indicates an amount of data that the mobile device is allowed to use over a predetermined period,
      wherein each threshold among the multiple thresholds corresponds to a data usage type among the multiple data usage types, and
      wherein the multiple thresholds include at least three of: a roaming data threshold, a home data threshold, an international data threshold, and a tethering data threshold;

obtain multiple data usage patterns associated with the mobile device,
   wherein each data usage pattern among the multiple data usage patterns corresponds to a threshold among the multiple thresholds;
iterate over each data usage pattern among the multiple data usage patterns to determine whether the mobile device has exceeded or is likely to exceed the threshold associated with each data usage pattern within the predetermined period;
upon determining that at least one data usage pattern has exceeded or is likely to exceed the threshold associated with the at least one data usage pattern within the predetermined period, determine an increase to the threshold,
   wherein the increase to the threshold accommodates an anticipated data usage associated with the at least one data usage pattern;
send an indication of the increase to the threshold to the mobile device;
receive a response from the mobile device; and
based on the response, apply the increase to the threshold.

2. The at least one non-transitory computer-readable storage medium of claim 1, comprising instructions to:
obtain historical data associated with the mobile device,
   wherein the historical data indicates a second multiplicity of data usage patterns associated with the mobile device over a period, and
   wherein the period includes multiple predetermined periods;
iterate over the multiple predetermined periods to determine a frequent data usage pattern associated with the data usage type among the multiple data usage types;
determine whether the frequent data usage pattern associated with the data usage type exceeds the threshold associated with the data usage type; and,
upon determining that the frequent data usage pattern associated with the data usage type exceeds the threshold associated with the data usage type, send an indication to the mobile device to make the increase permanent.

3. The at least one non-transitory computer-readable storage medium of claim 1, comprising instructions to:
obtain historical data associated with the mobile device,
   wherein the historical data indicates a second multiplicity of data usage patterns associated with the mobile device over a period, and
   wherein the period includes multiple predetermined periods;
iterate over the multiple predetermined periods to determine a frequent data usage pattern associated with the data usage type among the multiple data usage types;
determine whether the frequent data usage pattern associated with the data usage type exceeds the threshold associated with the data usage type;
upon determining that the frequent data usage pattern associated with the data usage type does not exceed the threshold associated with the data usage type, determine a time remaining within the predetermined period; and,
send an indication to the mobile device to make the increase within the time remaining within the predetermined period.

4. The at least one non-transitory computer-readable storage medium of claim 1, wherein the instructions to determine the increase to the threshold comprise instructions to:
determine whether the at least one data usage pattern exceeds the threshold;
upon determining that the at least one data usage pattern exceeds the threshold, determine a rate of data usage associated with each data usage type;
determine time remaining within the predetermined period; and
based on the time remaining within the predetermined period and the rate of data usage associated with each data usage type, determine the anticipated data usage.

5. The at least one non-transitory computer-readable storage medium of claim 1, comprising instructions to:
send a message to the mobile device indicating a response that when generated by the mobile device represents an acceptance of the increase,
   wherein the message consumes 2 kB or less of data associated with the mobile device; and
receive the response representing the acceptance of the increase,
   wherein the response consumes 4 bytes or less of data associated with the mobile device.

6. The at least one non-transitory computer-readable storage medium of claim 1, comprising instructions to:
determine whether the mobile device exceeded the international data threshold over multiple previous predetermined periods;
upon determining that the mobile device exceeded the international data threshold over the multiple previous predetermined periods, determine an average amount by which the mobile device exceeded the international data threshold over the multiple previous predetermined periods; and
send a notification to the mobile device to permanently increase the international data threshold by the average amount.

7. The at least one non-transitory computer-readable storage medium of claim 1, comprising instructions to:
determine whether the mobile device exceeded the roaming data threshold over multiple previous predetermined periods;
upon determining that the mobile device exceeded the roaming data threshold over the multiple previous predetermined periods, determine a maximum amount by which the mobile device exceeded the international data threshold over the multiple previous predetermined periods; and
send a notification to the mobile device to permanently increase the roaming data threshold by the maximum amount.

8. A system comprising:
at least one hardware processor; and
at least one non-transitory memory storing instructions, which, when executed by the at least one hardware processor, cause the system to:
   obtain multiple thresholds for multiple bandwidth usage types associated with a user equipment (UE),
     wherein a threshold among the multiple thresholds indicates an amount of bandwidth associated with a wireless telecommunication network that the UE is allowed to use within a predetermined period or before a predetermined time,
     wherein each threshold among the multiple thresholds corresponds to a bandwidth usage type among the multiple bandwidth usage types, and
     wherein the multiple thresholds include at least two of: a roaming data threshold, a home data threshold, a voice over Internet protocol (IP) threshold, an international voice over IP threshold, a roaming voice over IP threshold, an international data threshold, and a tethering data threshold;

obtain multiple bandwidth usage patterns associated with the UE,
   wherein each bandwidth usage pattern among the multiple bandwidth usage patterns corresponds to the threshold among the multiple thresholds;

iterate over each bandwidth usage pattern among the multiple bandwidth usage patterns to determine whether the UE has exceeded or is likely to exceed the threshold associated with each bandwidth usage pattern within the predetermined period or before a predetermined time;

upon determining that a bandwidth usage pattern has exceeded or is likely to exceed the threshold associated with the bandwidth usage pattern within the predetermined period or before a predetermined time, determine an increase to the threshold,
   wherein the increase to the threshold accommodates an anticipated usage associated with the bandwidth usage pattern; and send an indication of the increase to the threshold to the UE.

9. The system of claim 8, comprising instructions to:
obtain historical data associated with the UE,
   wherein the historical data indicates a second multiplicity of bandwidth usage patterns associated with the UE over a period,
   wherein the period includes multiple predetermined periods;
iterate over the multiple predetermined periods to determine a frequent bandwidth usage pattern associated with the bandwidth usage type among the multiple bandwidth usage types;
determine whether the frequent bandwidth usage pattern associated with the bandwidth usage type exceeds a threshold associated with the bandwidth usage type; and
upon determining that the frequent bandwidth usage pattern associated with the bandwidth usage type exceeds the threshold associated with the bandwidth usage type, send an indication to the UE to make the increase permanent.

10. The system of claim 8, comprising instructions to:
obtain historical data associated with the UE,
   wherein the historical data indicates a second multiplicity of bandwidth usage patterns associated with the UE over a period,
   wherein the period includes multiple predetermined periods;
iterate over the multiple predetermined periods to determine a frequent bandwidth usage pattern associated with a bandwidth usage type among the multiple bandwidth usage types;
determine whether the frequent bandwidth usage pattern associated with the bandwidth usage type exceeds a threshold associated with the bandwidth usage type; and
upon determining that the frequent bandwidth usage pattern associated with the bandwidth usage type does not exceed the threshold associated with the bandwidth usage type, determine a time remaining within the predetermined period; and
send an indication to the UE to make the increase within the time remaining within the predetermined period.

11. The system of claim 8, wherein the instructions to determine the increase to the threshold comprise instructions to:
determine whether the bandwidth usage pattern exceeds the threshold;
upon determining whether the bandwidth usage pattern exceeds the threshold, determine a rate of usage associated with each bandwidth usage type;
determine time remaining within the predetermined period; and
based on the time remaining within the predetermined period and the rate of usage associated with each bandwidth usage type, determine the anticipated usage.

12. The system of claim 8, comprising instructions to:
send a message to the UE indicating a response that, when generated by the UE, represents an acceptance of the increase,
   wherein the message consumes 2 kB or less of bandwidth associated with the UE; and
receive the response representing the acceptance of the increase,
   wherein the response consumes 4 bytes or less of bandwidth associated with the UE.

13. The system of claim 8, comprising instructions to:
determine whether the UE exceeded the international data threshold over multiple previous predetermined periods;
upon determining that the UE exceeded the international data threshold over the multiple previous predetermined periods, determine an average amount by which the UE exceeded the international data threshold over the multiple previous predetermined periods; and
send a notification to the UE to permanently increase the international data threshold by the average amount.

14. The system of claim 8, comprising instructions to:
determine whether the UE exceeded the roaming data threshold over multiple previous predetermined periods;
upon determining that the UE exceeded the roaming data threshold over the multiple previous predetermined periods, determine a maximum amount by which the UE exceeded the international data threshold over the multiple previous predetermined periods; and
send a notification to the UE to permanently increase the roaming data threshold by the maximum amount.

15. A system for use with a UE operating on a wireless telecommunication network comprising:
a Packet Network Data Gateway (PGW) configured to provide data access to the UE,
   wherein the data access includes multiple thresholds for multiple data usage types associated with the UE,
   wherein the threshold among the multiple thresholds indicates an amount of data associated with the wireless telecommunication network that the UE is allowed to use over a predetermined period or before a predetermined time,
   wherein each threshold among the multiple thresholds corresponds to a data usage type among the multiple data usage types, and
   wherein the multiple thresholds include at least two of: a roaming data threshold, a home data threshold, a voice over IP threshold, an international voice over IP threshold, a roaming voice over IP threshold, an international data threshold, and a tethering data threshold;

an Online Charging Server configured to:
   monitor multiple data usage patterns associated with the UE,
      wherein each data usage pattern among the multiple data usage patterns corresponds to the threshold among the multiple thresholds;
   determine whether a data usage pattern among the multiple data usage patterns exceeds a corresponding threshold among the multiple thresholds; and
   upon determining that the data usage pattern exceeds the corresponding threshold among the multiple thresholds, send an indication to throttle or discontinue a data usage type associated with the corresponding threshold; and
a recommender system configured to:
   receive the indication to throttle or discontinue the data usage type;
   upon receiving the indication to throttle or discontinue the data usage type, determine an increase to the corresponding threshold,
      wherein the increase to the corresponding threshold accommodates an anticipated usage associated with the data usage pattern; and
   send an indication of the increase to the corresponding threshold to the UE.

16. The system of claim 15, comprising the recommender system configured to:
   obtain historical data associated with the UE,
      wherein the historical data indicates a second multiplicity of data usage patterns associated with the UE over a period,
      wherein the period includes multiple predetermined periods;
   iterate over the multiple predetermined periods to determine a frequent data usage pattern associated with the data usage type among the multiple data usage types;
   determine whether the frequent data usage pattern associated with the data usage type exceeds a threshold associated with the data usage type; and
   upon determining that the frequent data usage pattern associated with the data usage type exceeds the threshold associated with the data usage type, send an indication to the UE to make the increase permanent.

17. The system of claim 15, comprising the recommender system configured to:
   obtain historical data associated with the UE,
      wherein the historical data indicates a second multiplicity of data usage patterns associated with the UE over a period,
      wherein the period includes multiple predetermined periods;
   iterate over the multiple predetermined periods to determine a frequent data usage pattern associated with the data usage type among the multiple data usage types;
   determine whether the frequent data usage pattern associated with the data usage type exceeds a threshold associated with the data usage type; and
   upon determining that the frequent data usage pattern associated with the data usage type does not exceed the threshold associated with the data usage type, determine a time remaining within the predetermined period; and
   send an indication to the UE to make the increase within the time remaining within the predetermined period.

18. The system of claim 15, wherein the recommender system configured to determine the increase to the threshold comprises the recommender system configured to:
   determine whether the data usage pattern exceeds the threshold;
   upon determining that the data usage pattern exceeds the threshold, determine a rate of usage associated with each data usage type;
   determine time remaining within the predetermined period; and
   based on the time remaining within the predetermined period and the rate of usage associated with each data usage type, determine the anticipated usage.

19. The system of claim 15, comprising the recommender system configured to:
   determine whether the UE exceeds the international data threshold over multiple previous predetermined periods;
   upon determining that the UE exceeds the international data threshold over the multiple previous predetermined periods, determine an average amount by which the UE exceeds the international data threshold over the multiple previous predetermined periods; and
   send a notification to the UE to permanently increase the international data threshold by the average amount.

20. The system of claim 15, comprising the recommender system configured to:
   determine whether the UE exceeds the roaming data threshold over multiple previous predetermined periods;
   upon determining that the UE exceeds the roaming data threshold over the multiple previous predetermined periods, determine a maximum amount by which the UE exceeds the international data threshold over the multiple previous predetermined periods; and
   send a notification to the UE to permanently increase the roaming data threshold by the maximum amount.

* * * * *